(12) United States Patent
Wang

(10) Patent No.: US 7,448,833 B1
(45) Date of Patent: Nov. 11, 2008

(54) AUTOMATIC TOOL CHANGING ASSEMBLY FOR A MACHINE TOOL

(76) Inventor: Daniel Wang, 1-212 Blues Point Road, McMaho-NS Point NSW 2060 (AU)

( * ) Notice: Subject to any disclaimer, the term of this patent is extended or adjusted under 35 U.S.C. 154(b) by 0 days.

(21) Appl. No.: 11/970,632

(22) Filed: Jan. 8, 2008

(51) Int. Cl.
*B23C 5/26* (2006.01)

(52) U.S. Cl. .............. 409/233; 415/152.1; 137/625.69; 251/366

(58) Field of Classification Search .............. 409/233, 409/231, 232; 408/239 R, 238; 415/152.1, 415/151, 156–157; 137/625.69; 251/366, 251/367
See application file for complete search history.

(56) References Cited

U.S. PATENT DOCUMENTS

| | | | | |
|---|---|---|---|---|
| 2,920,650 | A | * | 1/1960 | Moog, Jr. .............. 137/625.69 |
| 3,163,175 | A | * | 12/1964 | Pearson .................. 137/315.09 |
| 3,680,437 | A | * | 8/1972 | Cravens, Jr. ................ 409/233 |
| 3,898,911 | A | * | 8/1975 | DeCaussin ................... 409/233 |
| 4,511,295 | A | * | 4/1985 | Razdobreev ................. 409/233 |
| 4,734,000 | A | * | 3/1988 | Lenz ........................... 409/233 |
| 4,750,850 | A | * | 6/1988 | Husted ........................ 409/233 |
| 5,290,136 | A | * | 3/1994 | Wang .......................... 409/233 |
| 6,234,731 | B1 | * | 5/2001 | Sakamoto ................... 409/233 |

* cited by examiner

*Primary Examiner*—Erica E Cadugan
(74) *Attorney, Agent, or Firm*—Rabin & Berdo, P.C.

(57) ABSTRACT

An automatic tool changing assembly for a machine tool has a bottom frame, a base, a cylinder block, an air motor and an air transporting device. The bottom frame is securely mounted on the machine tool and has a bottom panel, two sliding bars and a spring. The base is movably mounted on the bottom frame above the bottom panel and abutting the spring. The cylinder block is securely mounted on the base and has a piston rod, a piston disk and an air cylinder. The air motor is securely mounted on the base and has a cylinder, a jacket, a mounting groove and a cylinder tube. The air transporting device is mounted in the air motor and has a mounting tube, a first compression ring, a first sealing ring, a middle compression ring, a second sealing ring, a second compression ring, a mounting axle and an axle spring.

4 Claims, 10 Drawing Sheets

AUTOMATIC TOOL CHANGING ASSEMBLY FOR A MACHINE TOOL

BACKGROUND OF THE INVENTION

1. Field of the Invention

The present invention relates to an automatic tool changing assembly, and more particularly to an automatic tool changing assembly for a machine tool that can be used easily and accurately.

2. Description of Related Art

With reference to FIG. 10, a conventional machine tool (90) has a base (91), a spindle (92), a nut (93), a tool (94), an air motor (95) and a control device. The base (91) has a central hole and an engaging panel (911). The engaging panel (911) is securely mounted in the central hole of the base (91). The spindle (92) protrudes through the central hole of the base (91) and has an upper end and a lower end. The nut (93) is formed on the upper end of the spindle (92) and may abut the engaging panel (911) in the central hole of the base (91). The tool (94) is detachably connected to the lower end of the spindle (92). The air motor (95) is mounted on the base (91) above the spindle (92) and has a driving axle and a jacket (951). The jacket (951) is connected to the driving axle and is selectively mounted around the nut (93). The control device is connected to the air motor (95) and has an air valve, two controlling buttons, two induction pipes (96) and an inlet pipe. The controlling buttons are used to control the air valve. One of the induction pipes (96) is connected to the air motor (95) and the other induction pipe (96) is connected to the jacket (951). The inlet pipe is connected to the air valve.

The tool (94) is selectively held by the spindle (92) by pressing one of the controlling buttons to let air flow into the air motor (95) and the jacket (951) via the induction pipes (96) to make the spindle (92) rotate and hold the tool (94). When the tool (94) needs replacing, the controlling button is pressed to let the air flow into the air motor (95), the jacket (951) and the air valve via the induction pipes (96) and the inlet pipe to force the spindle (92) to rotate in an inverse direction and separate from the tool (94).

However, the conventional machine tool has the following defects and shortcomings.

1. As the spindle (92) is rotated with the jacket (951) to loosen the tool (94) by the air motor (95), air enters the induction pipe (96) and the inlet pipe at a same time and this decreases the force of the air motor (95) to loosen the tool (94).

2. The engaging panel (911) of the base (91) that may abut the nut (93) merely provides a holding effect and prevents the jacket (951) from moving and obtaining good contact with the nut (93).

3. Although the driving axle of the air motor (95) can rotate the jacket (951) forward and reverse to loosen or fasten the tool (94), the driving axle cannot rotate stably and this will influence the operation of changing the tool (94) of the conventional machine tool (90).

The automatic tool changing assembly for a machine tool in accordance with the present invention mitigates or obviates the aforementioned problems.

SUMMARY OF THE INVENTION

The main objective of the present invention is to provide an automatic tool changing assembly for a machine tool that allows a tool to be changed easily and accurately.

The automatic tool changing assembly for a machine tool in accordance with the present invention has a bottom frame, a base, a cylinder block, an air motor and an air-transporting device. The bottom frame is securely mounted on the machine tool and has a bottom panel, two sliding bars and a spring. The base is movably mounted on the bottom frame above the bottom panel and abutting the spring. The cylinder block is securely mounted on the base and has a piston rod, a piston disk and an air cylinder. The air motor is securely mounted on the base and has a cylinder, a jacket, a mounting groove and a cylinder tube. The air transporting device is mounted in the air motor and has a mounting tube, a first compression ring, a first sealing ring, a middle compression ring, a second sealing ring, a second compression ring, a mounting axle and an axle spring.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
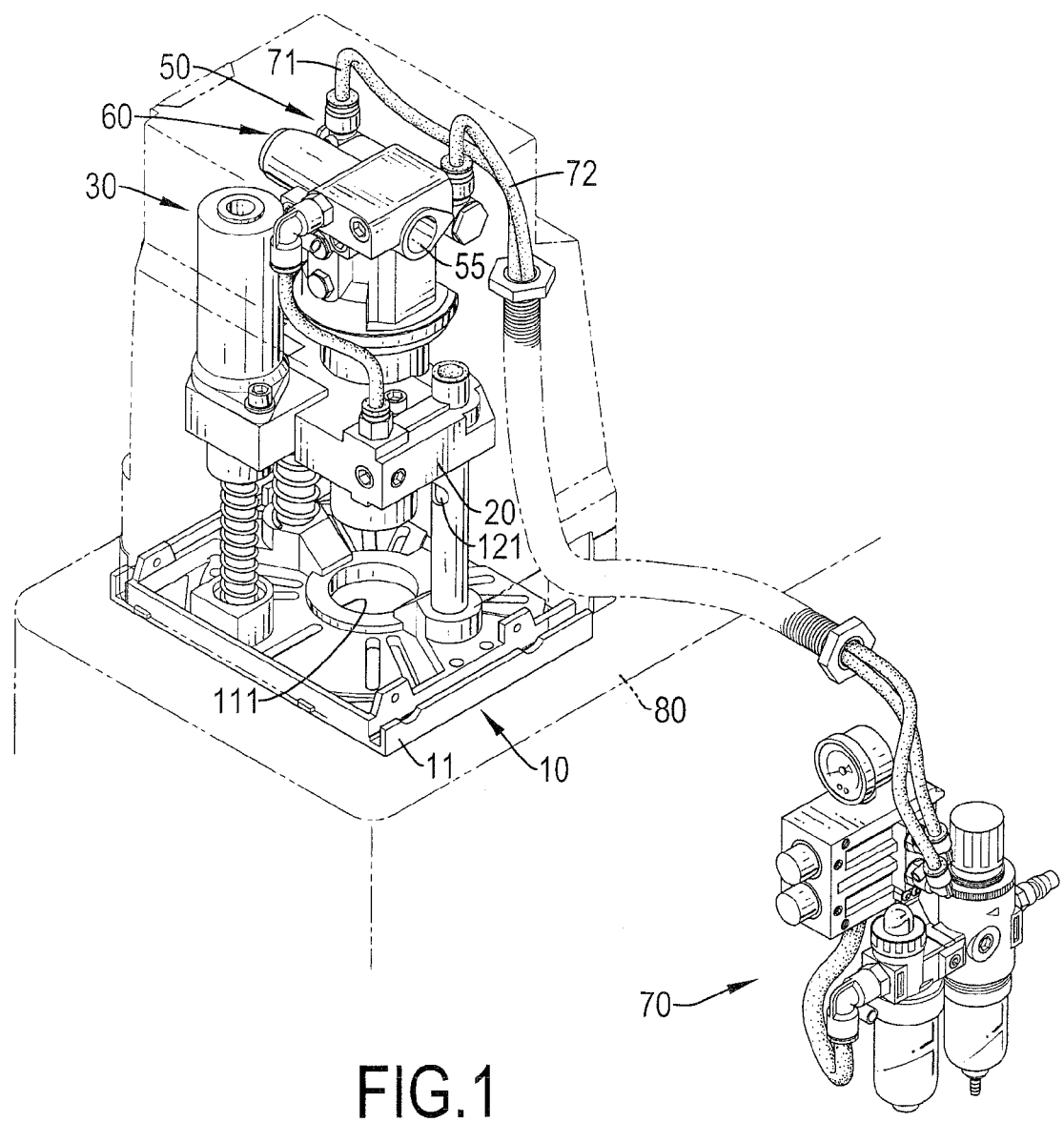
FIG. 1 is a perspective view of an automatic tool changing assembly in accordance with the present invention, mounted on a machine tool.
Figure 2:
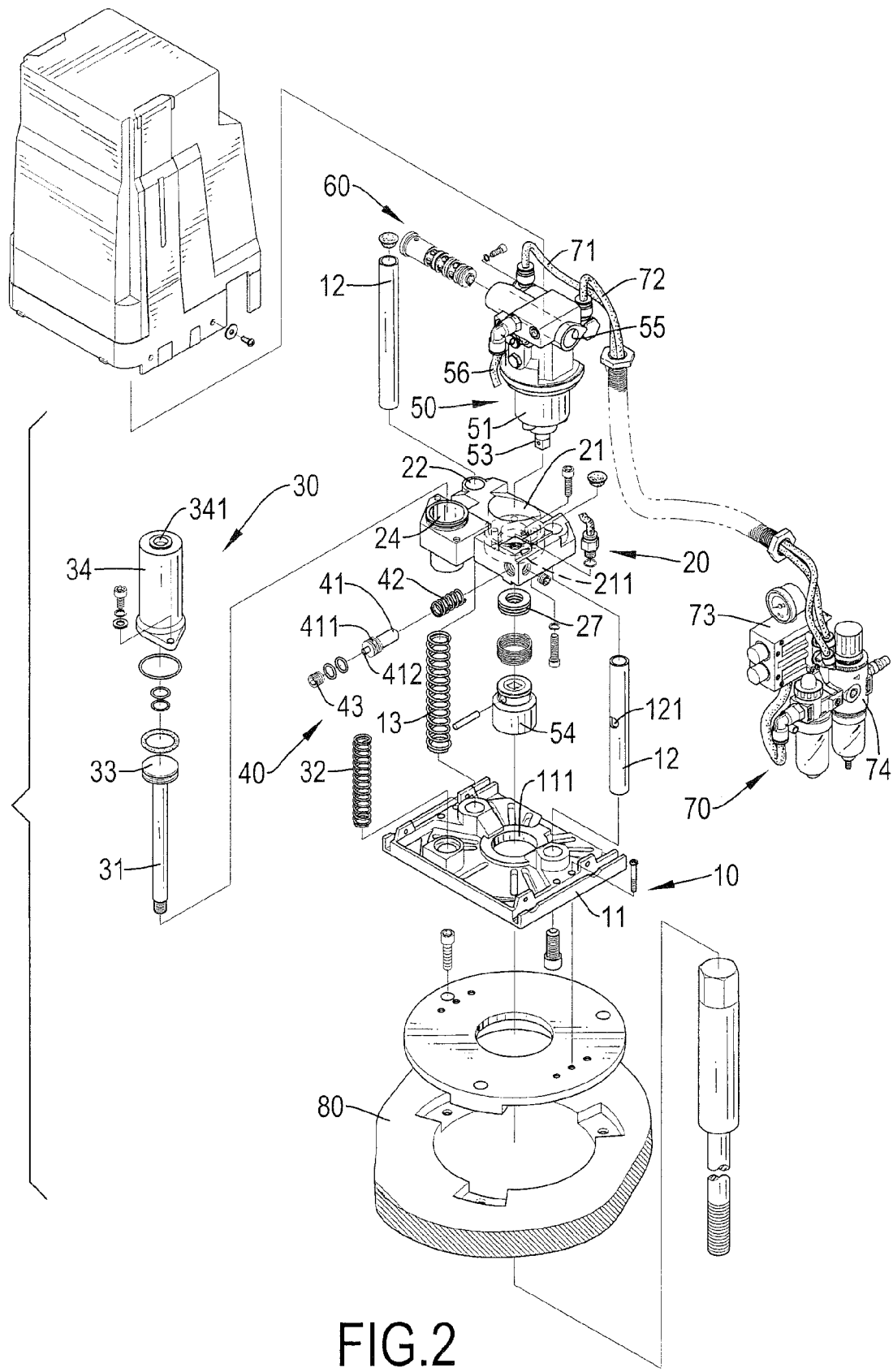
FIG. 2 is an enlarged exploded perspective view of the automatic tool changing assembly in FIG. 1.
Figure 3:
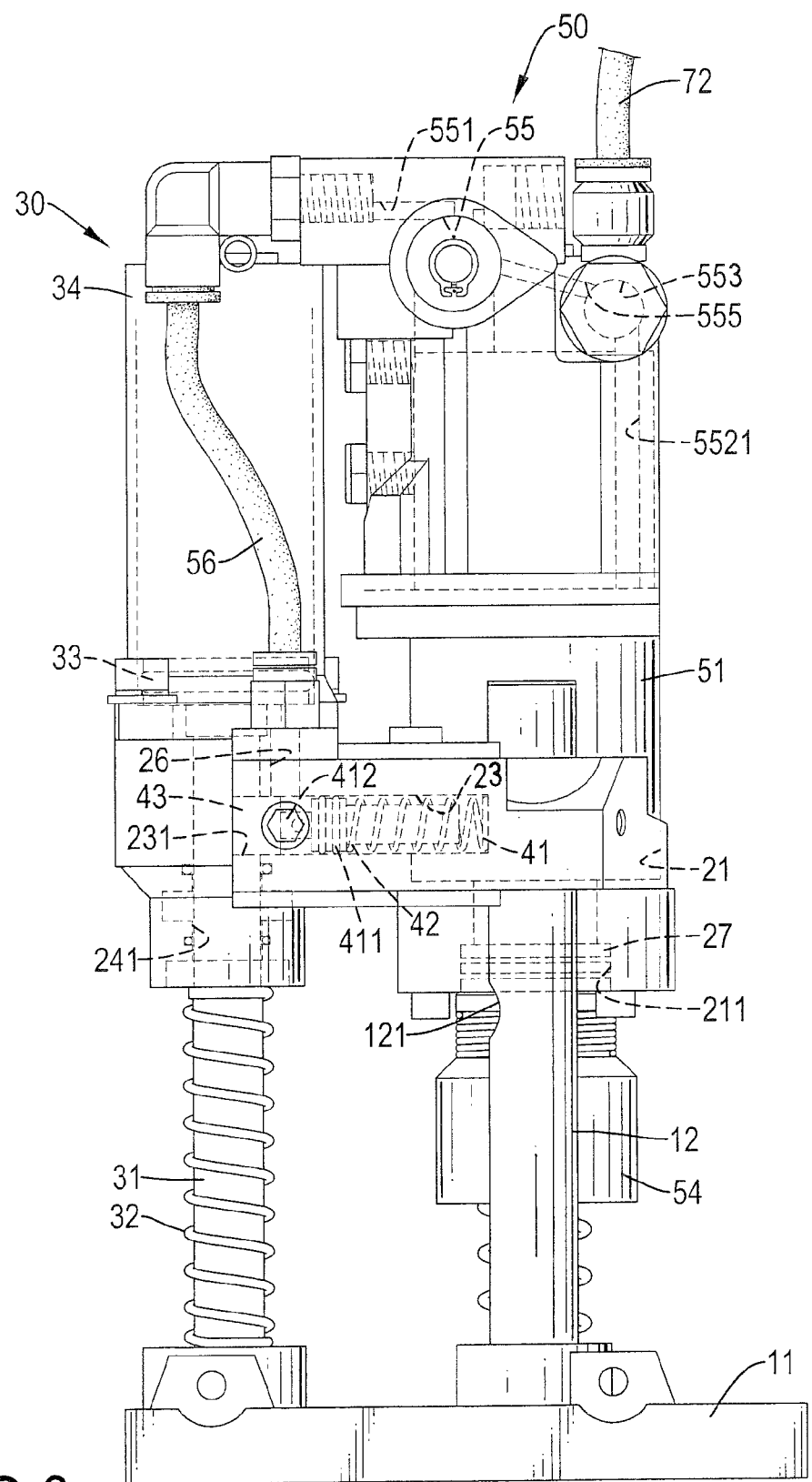
FIG. 3 is an enlarged side view in partial section of the automatic tool changing assembly in FIG. 1, with some internal elements shown in phantom lines.
Figure 4:
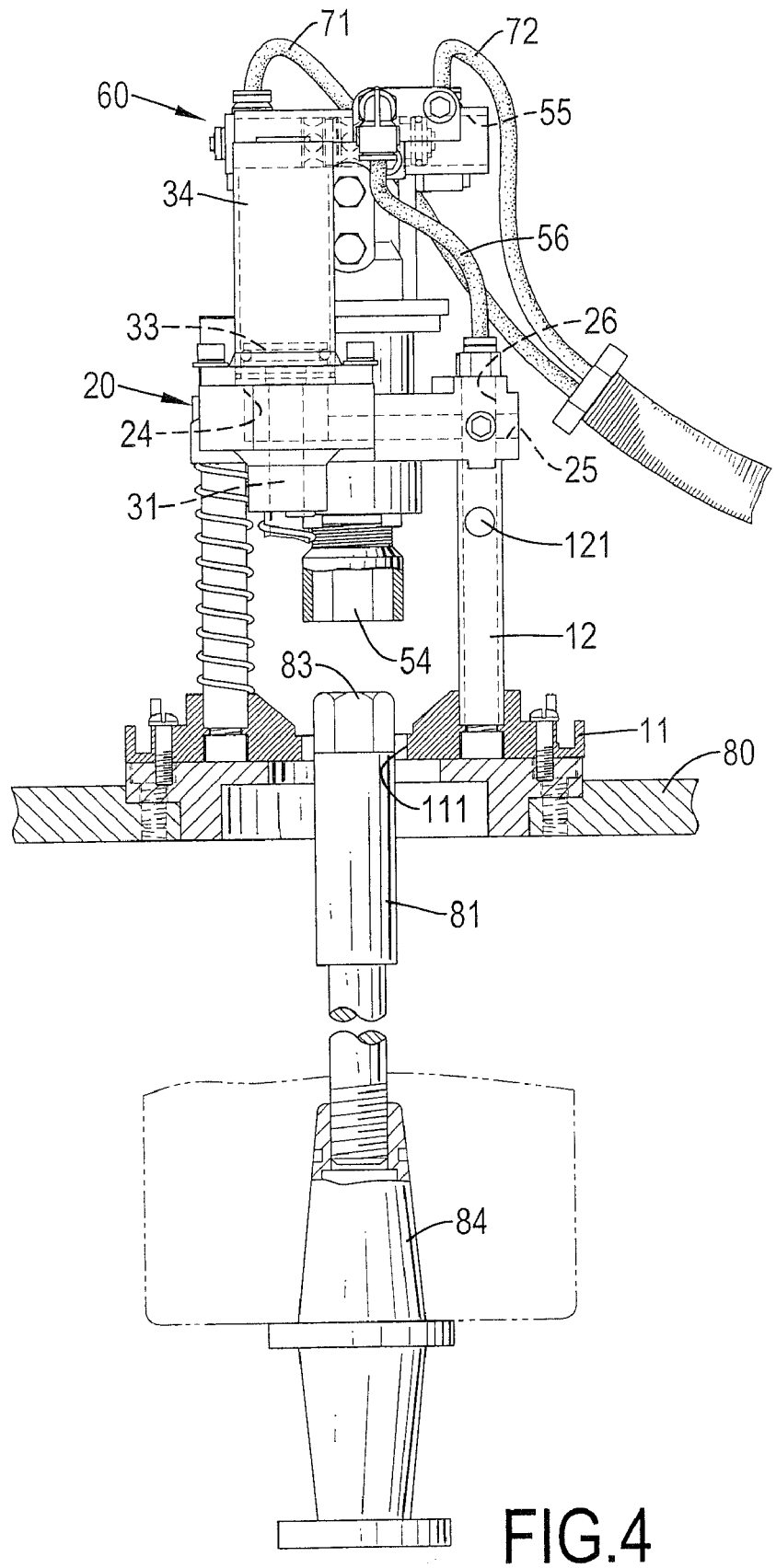
FIG. 4 is a side view in partial section of the automatic tool changing assembly in FIG. 1.
Figure 5:
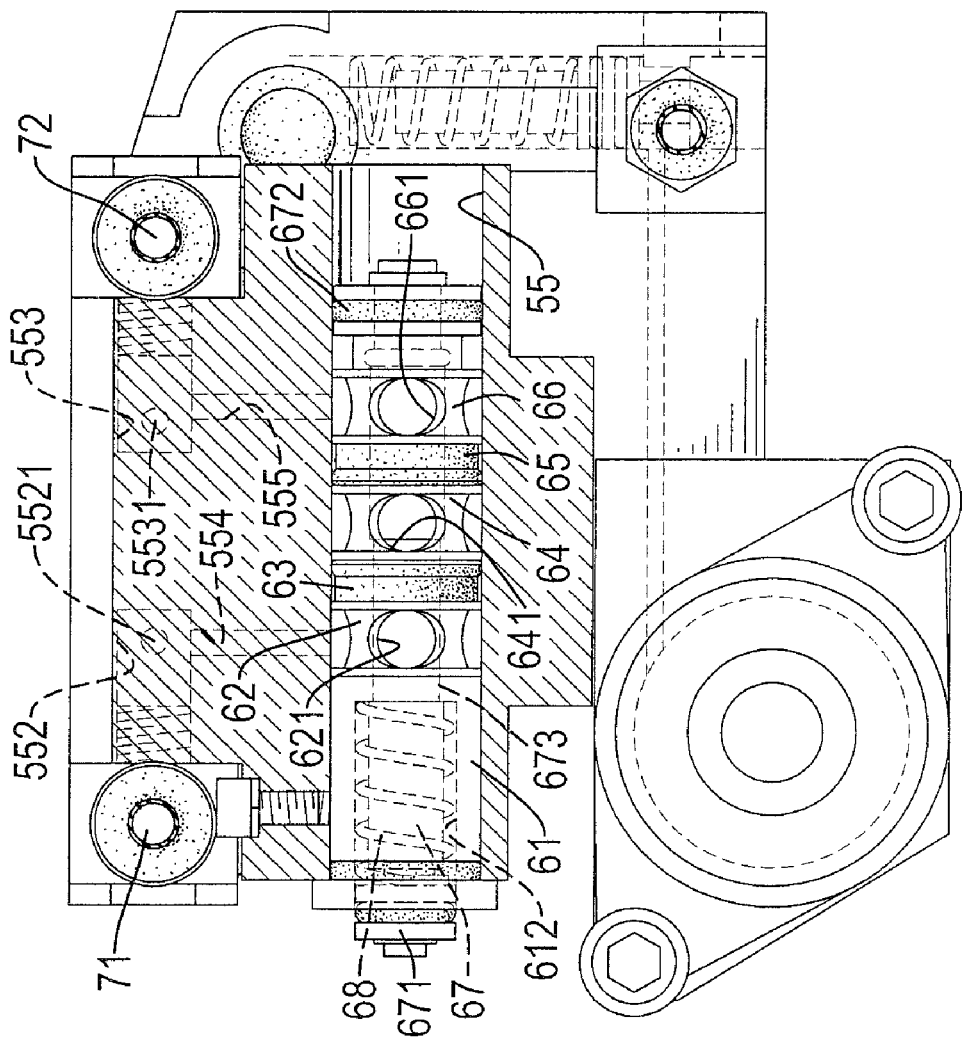
FIG. 5 is an enlarged top view in partial section of the automatic tool changing assembly in FIG. 1.
Figure 6:
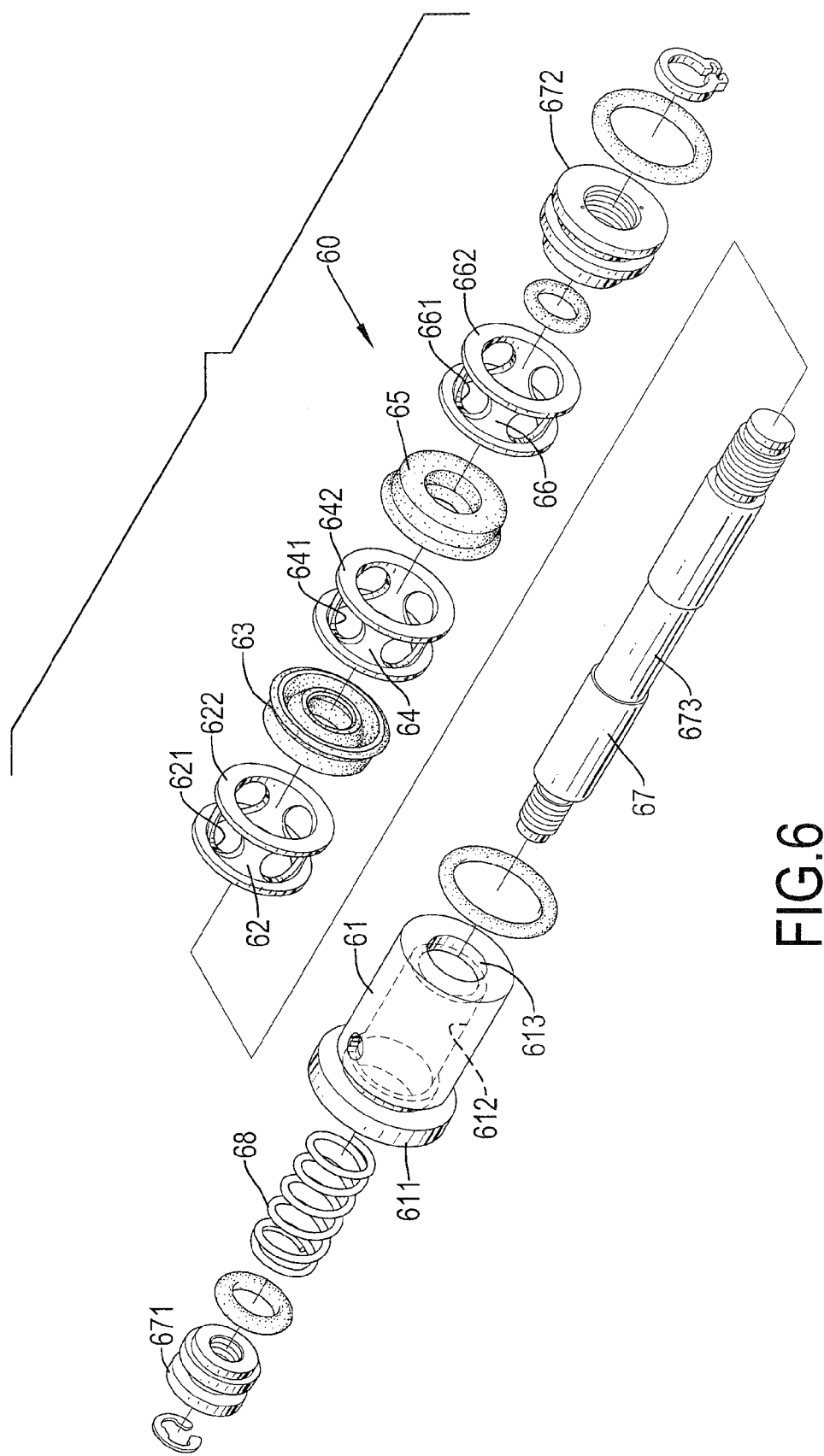
FIG. 6 is an enlarged exploded perspective view of an air transporting device of the automatic tool changing assembly in FIG. 1.

With reference to FIGS. 1 to 6, an automatic tool changing assembly in accordance with the present invention for a machine tool having a body (80), a spindle (81) with an upper end and a lower end, a nut (83) formed on the upper end of the spindle (81) and a tool (84) detachably connected to the lower end of the spindle (81) and the automatic tool changing assembly is mounted on the body (80) of the machine tool and the automatic tool changing assembly comprises a bottom frame (10), a base (20), a cylinder block (30), an optional positioning device (40), an air motor (50), an air transporting device (60) and an optional control device (70).

The bottom frame (10) is securely mounted on the machine tool and has a bottom panel (11), two sliding bars (12) and a spring (13). The bottom panel (11) is mounted on the body (80) of the machine tool and has a center, a top surface and a through hole (111). The through hole (111) is formed in the center of the bottom panel (11). The upper end of the spindle (81) is extended into the through hole (111) of the bottom panel (11). The sliding bars (12) are securely mounted on the top surface of the bottom panel (11) adjacent to the through hole (111) and one of the sliding bars (12) has a positioning hole (121) formed in the sliding bar (12). The spring (13) is mounted around the other sliding bar (12).

The base (20) is movably mounted on the bottom frame (10) above the bottom panel (11), abuts the spring (13) and has a center, a mounting hole (21), two sliding holes (22), a lever hole (23), an inlet hole (26), a cylinder hole (24) and a connecting hole (25).

The mounting hole (21) is formed in the center of the base (20) and aligns with the through hole (111) of the bottom panel (11) and has a diameter, a mounting segment (211) and a bearing (27). The mounting segment (211) is formed in the base (20) below the mounting hole (21) and has a diameter smaller the diameter of the mounting hole (21). The bearing (27) is mounted in the mounting segment (211) of the mounting hole (21).

The sliding holes (22) are formed in the base (20) near the mounting hole (21) and mounted around the sliding bars (12) of the bottom frame (10).

The lever hole (23) is transversally formed in the base (20) near the sliding bar (12) having the positioning hole (121) and has an inner end, an outer end, an inner surface and an inner thread (231). The inner end of the lever hole (23) selectively communicates with the positioning hole (121) of the sliding bar (12). The inner thread (231) is formed on the inner surface of the lever hole (23) near the outer end.

The inlet hole (26) is longitudinally formed in the base (20) and communicates with the outer end of the lever hole (23).

The cylinder hole (24) is longitudinally formed in the base (20) near one of the sliding holes (22) and has a diameter, an inner surface and a position detent (241). The position detent (241) is formed in the base (20) below the cylinder hole (24) and has a diameter smaller than the diameter of the cylinder hole (24).

The connecting hole (25) is transversally formed in the base (20) between the outer end of the lever hole (23) and the cylinder hole (24).

The cylinder block (30) is securely mounted on the base (20) and has a piston rod (31), an optional rod spring (32), a piston disk (33) and an air cylinder (34).

The piston rod (31) is securely mounted on the bottom panel (11), is extended through the cylinder hole (24) and the piston hole (241) and has a lower end and an upper end. The lower end of the piston rod (31) is securely mounted on the top surface of the bottom panel (11). The upper end of the piston rod (31) is extended out the cylinder hole (24) of the base (20).

The rod spring (32) is mounted around the piston rod (31) and has two ends respectively abutting the bottom panel (11) and the base (20).

The piston disk (33) is formed on the upper end of the piston rod (31).

The air cylinder (34) is securely mounted on the base (20) around the cylinder hole (24) and has a bottom, a top and a ventilating hole (341). The bottom of the air cylinder (34) is mounted on cylinder hole (24) of the base (20). The ventilating hole (341) is formed in the top of the air cylinder (34) and aligns with the cylinder hole (24).

The positioning device (40) is mounted in the base (20) and has a positioning lever (41), a lever spring (42) and a setscrew (43).

The positioning lever (41) is mounted in the lever hole (23) of the base (20) and has an inner end, an outer end, a piston (411) and a protrusion (412). The inner end of the positioning lever (41) is mounted in the inner end of the lever hole (23) and faces the sliding bar (12) having the positioning hole (121). The piston (411) is formed on the outer end of the positioning lever (41) and has an outer end. The protrusion (412) is formed on and protrudes from the outer end of the piston (411).

The lever spring (42) is mounted around the positioning lever (41) and has two ends respectively connected to the sliding bar (12) and the piston (411).

The setscrew (43) is mounted in the lever hole (23), engages the inner thread (231) and abuts the protrusion (412).

The air motor (50) is securely mounted on the base (20) and has a cylinder (51), a driving axle (53), a jacket (54), a mounting groove (55) and a cylinder tube (56).

The cylinder (51) is securely mounted in the mounting hole (21) of the base (20) and has a top, a bottom, a reverse groove (552) and a forward groove (553). The reverse groove (552) is transversally formed in the top of the cylinder (51) and has a bottom and a through hole (5521). The through hole (5521) is perpendicularly formed in the reverse groove (552) near the bottom. The forward groove (553) is transversally formed in the top of the cylinder (51) and aligns with the reverse groove (552) and has a bottom and a through hole (5531). The through hole (5531) is formed perpendicularly in the forward groove (553) near the bottom.

The driving axle (53) is formed on and protrudes from the bottom of the cylinder (51) and is mounted with the bearing (27) in the mounting segment (211) of the mounting hole (21) and has a lower connecting end.

The jacket (54) is connected to the bottom of the cylinder (51), may be connected to the lower connecting end of the driving axle (53) and aligns with the through hole (111) of the bottom panel (11) to hold the nut (83) of the upper end of the spindle (81).

The mounting groove (55) is transversally formed in the top of the cylinder (51) parallel to the reverse groove (552) and the forward groove (553) and has a middle, a tube hole (551), a reverse inlet hole (554) and a forward inlet hole (555). The tube hole (551) is perpendicularly formed in the middle of the mounting groove (55). The reverse inlet hole (554) is formed in the mounting groove (55) near the tube hole (551) and communicates with the reverse groove (552). The forward inlet hole (555) is formed in the mounting groove (55) near the tube hole (551), faces to the reverse inlet hole (554) and communicates with the forward groove (553).

The cylinder tube (56) is connected to the tube hole (551) of the mounting groove (55) and the inlet hole (26) of the base (20).

The air transporting device (60) is mounted in the air motor (50) and has a mounting tube (61), a first compression ring (62), a first sealing ring (63), a middle compression ring (64), a second sealing ring (65), a second compression ring (66), a mounting axle (67) and an axle spring (68).

The mounting tube (61) is mounted in the mounting groove (51) of the air motor (50) has an inner end, an outer end, an annular flange (611), an inserting hole (612) and an axle hole (613). The inner end of the mounting tube (61) is mounted in the mounting groove (51) near the reverse inlet hole (554). The annular flange (611) is formed on the outer end of the mounting tube (61) to contact with the air motor (50). The inserting hole (612) is axially formed in the mounting tube (61). The axle hole (613) is formed in the inner end of the mounting tube (61) and communicates with the inserting hole (612) and has a diameter.

The first compression ring (62) is mounted in the mounting groove (51) near the reverse inlet hole (554) and has two ends, a sidewall, four gas holes (621) and two sealing flanges (622). The gas holes (621) are formed through the sidewall of the first compression ring (62). The sealing flanges (622) are respectively formed on the ends of the first compression ring (62).

The first sealing ring (63) is mounted in the mounting groove (55) between the tube hole (551) and the reverse inlet hole (554) and has a same diameter as the diameter of the axle hole (613).

The middle compression ring (64) is mounted in the mounting groove (55) near the tube hole (551) adjacent to the first sealing ring (63) and has two ends, a sidewall, four gas holes (641) and two sealing flanges (642). The gas holes (641) are formed through the sidewall of the middle compression ring (64). The sealing flanges (642) are respectively formed on the ends of the middle compression ring (64).

The second sealing ring (65) is mounted in the mounting groove (55) between the tube hole (551) and the forward inlet hole (555) and has a same diameter as the diameter of the axle hole (613).

The second compression ring (66) is mounted in the mounting groove (55) near the forward inlet hole (555) adjacent to the second sealing ring (64) and has two ends, a sidewall, four gas holes (661) and two sealing flanges (662). The gas holes (661) are formed through the sidewall of the second compression ring (66). The sealing flanges (662) are respectively formed on the ends of the second compression ring (66).

The mounting axle (67) is mounted in the mounting tube (61), through the compression rings (62, 64, 66) and the sealing rings (63, 65) and has a diameter, an inner end, an outer end, an outer head (671), an inner head (672) and a neck (673). The diameter of the mounting axle (67) is same as the diameter of the axle hole (613). The outer end of the mounting axle (67) is extended out the inserting hole (612) of the mounting tube (61). The outer head (671) is mounted around the outer end of the mounting axle (67) and abuts the annular flange (611). The inner end of the mounting axle (67) is extended out the second compression ring (66). The inner head (672) is mounted around the inner end of the mounting axle (67) and abuts the second compression ring (66). The neck (673) is formed between the inner and outer ends of the mounting axle (67).

The axle spring (68) is mounted around the mounting axle (67) in the mounting tube (61) and has two ends. The ends of the axle spring (68) respectively abut the outer head (671) of the mounting axle (67) and mounting tube (61) near the axle hole (613).

The control device (70) is connected to the air motor (50) and has a valve (73) and a lubricator (74). The valve (73) is connected to the air motor (50) and has a first induction pipe (71) and a second induction pipe (72). The first induction pipe (71) is connected to the reverse groove (552). The second induction pipe (72) is connected to the forward groove (553). The lubricator (74) is connected to the valve (73) to lubricate air that flows into the valve (73).

Figure 7:
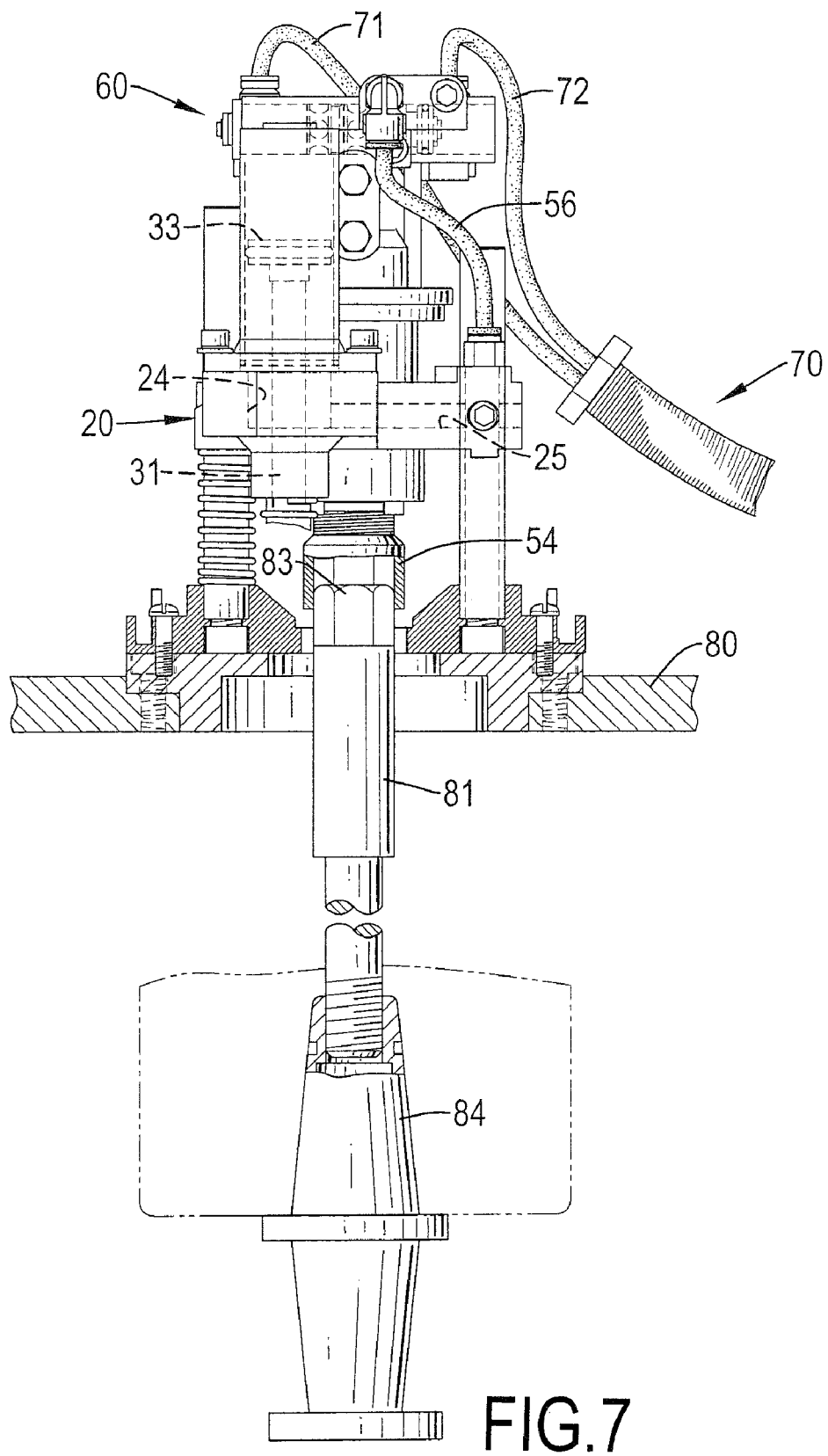
FIG. 7 is an operational side view in partial section of the automatic tool changing assembly in FIG. 1, shown engaging a nut of a tool.
Figure 8:
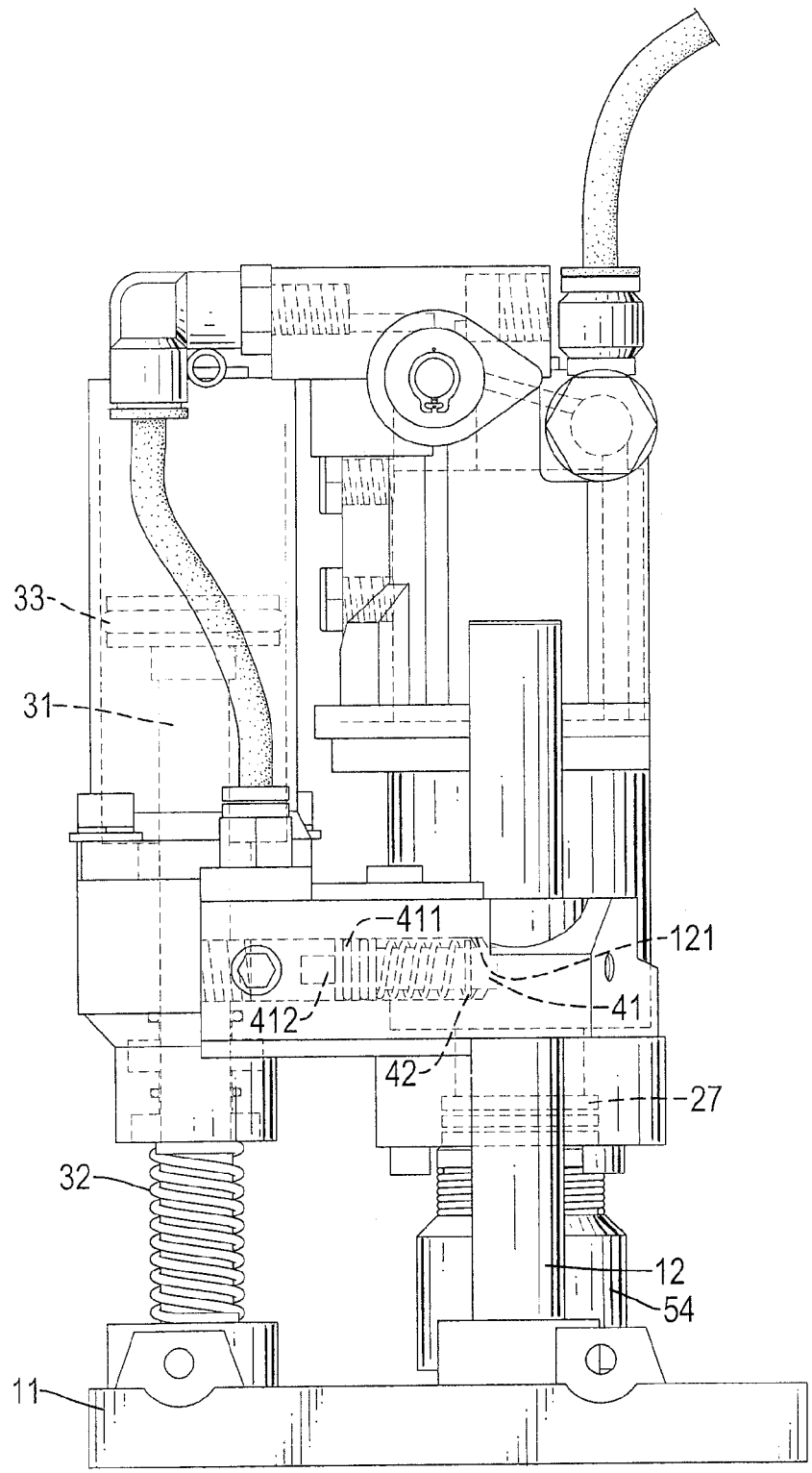
FIG. 8 is another enlarged operational side view in partial section of the automatic tool changing assembly in FIG. 3.

With reference to FIGS. 7 and 8, a user can loosen the tool (84) from the machine tool by the control device (70), air flows into the air motor (50) by the first induction pipe (71) of the valve (73). Then, air flows into the cylinder (51) and the mounting groove (55) via the reverse groove (552), the through hole (5521) and the reverse inlet hole (554) to push the driving axle (53) and the jacket (54) to rotate in reverse. At the same time, air pushes the piston disk (33) to move upward along the air cylinder (34) when air flows into the air cylinder (34) via the reverse inlet hole (554), the mounting groove (55), the tube hole (551), the cylinder tube (56) and the connecting hole (25) of the base (20). With movement of the piston disk (33) relative to the air cylinder (34), the base (20), the cylinder block (30) and the air motor (50) are moved from an original position downward by air flowing into the connecting hole (25) of the base (20) pushing the piston (411) of the positioning lever (41) along the sliding bars (12). When the positioning lever (41) moves near the positioning hole (121), the inner end of the positioning lever (41) will extend into the positioning hole (121) to hold the base (20), and the jacket (50) of the air motor (50) is mounted around the nut (83) and rotates the nut (83) and the spindle (82) to separate the spindle (82) from the tool (84). After the tool (84) is separated from the spindle (82), the valve (73) will stop forcing air into the air motor (50) by the first induction pipe (71), and lever spring (42) will push the positioning lever (41) moving to let the protrusion (412) separate from the positioning hole (121). Then, the rod spring (32) and the spring (13) will push the base (20) to return to the original location along the sliding bars (12).

Figure 9:
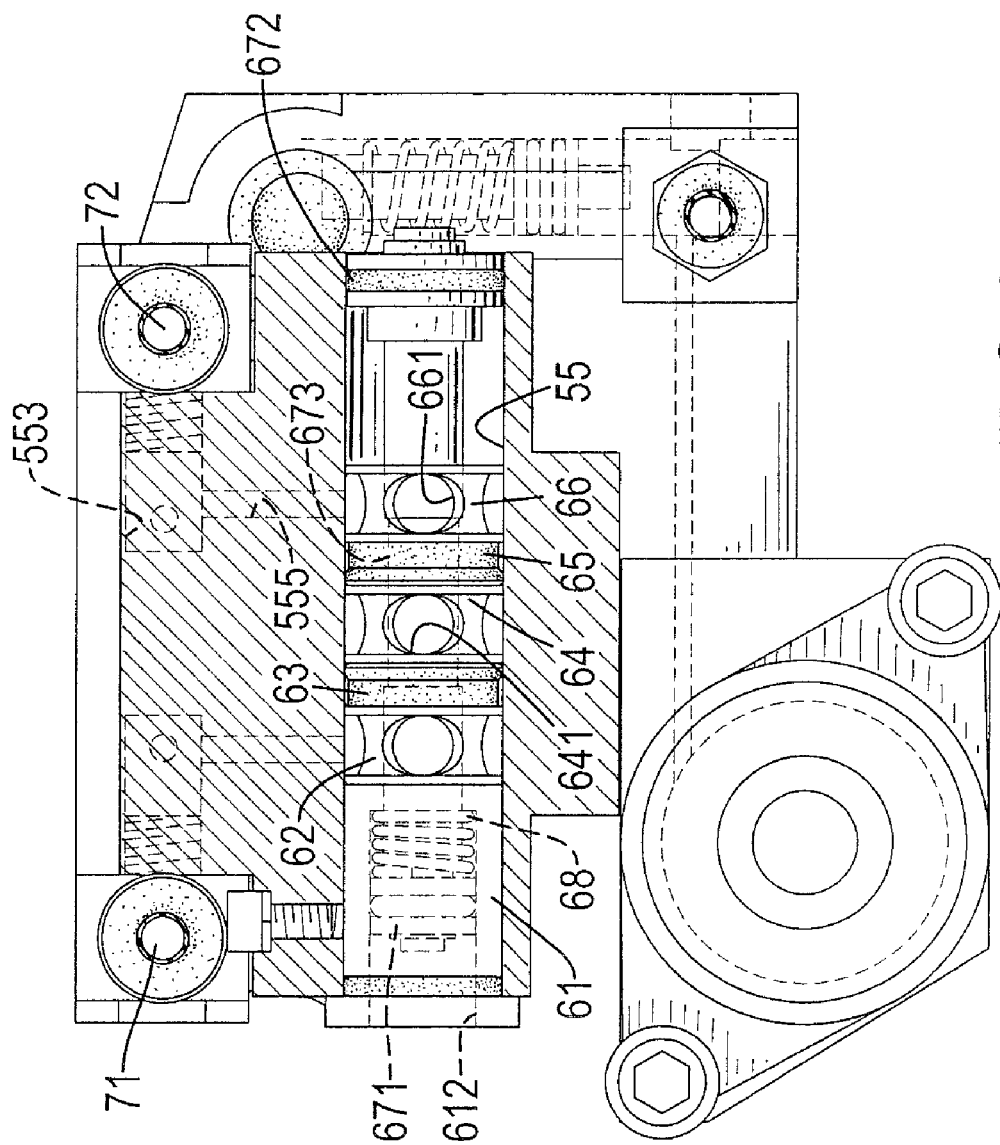
FIG. 9 is an operational top view in partial section of the automatic tool changing assembly in FIG. 5.
Figure 10:
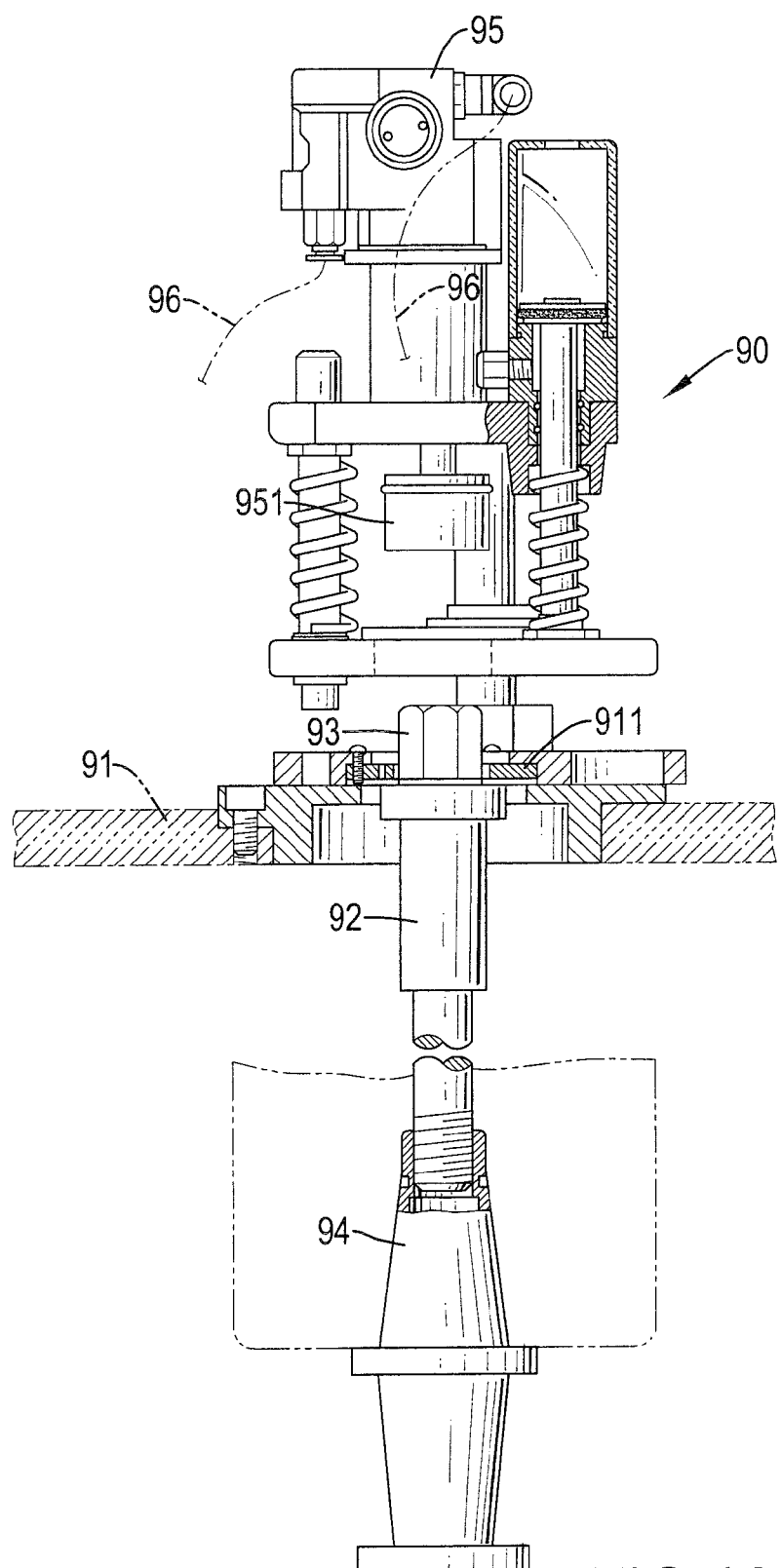
FIG. 10 is a side view in partial section of a conventional automatic tool changing assembly in accordance with the prior art.

Fastening the spindle (81) of the tool (84) follows a similar process. Forcing air into the second induction pipe (72) of the control device (70) allows the air to flow into the cylinder (51) and the mounting groove (55) via the forward groove (553), the through hole (5531) and the forward inlet hole (555) to push the driving axle (53) and the jacket (54) to rotate forwardly. With reference to FIG. 9, air flowing into the mounting groove (55) will push the inner head (672) to move outward, and the neck (673) will move between the middle compression ring (64) and the second compression ring (66) to let the forward inlet hole (555) communicate with the tube hole (551). Then, air flows into the air cylinder (34) to push the piston disk (33) to move upward via the cylinder tube (56) and the connecting hole (25) of the base (20). With the movement of the piston disk (33) relative to the air cylinder (34), the base (20), the cylinder block (30) and the air motor (50) will be moved downward by air flowing into the connecting hole (25) of the base (20) and pushing the piston (411) of the positioning lever (41) moving along the sliding bars (12). When the positioning lever (41) moves near the positioning hole (121), the inner end of the positioning lever (41) will extend into the positioning hole (121) to hold the base (20), and the jacket (50) of the air motor (50) mounted around the nut (83) and rotate the nut (83) and the spindle (82) to connect with the tool (84). After the tool (84) is connected to the spindle (82), the valve (73) will stop forcing air into the air motor (50) by the second induction pipe (72), and the lever spring (42) will push the positioning lever (41) to move and allow the protrusion (412) separate from the positioning hole (121). Then, the rod spring (32) and the spring (13) will push the base (20) to return to the original position along the sliding bars (12).

The machine tool as described has the following advantages.

1. With the movement of the air transporting device (60), air can flow into the tube hole (551) and the mounting groove (55) via the reverse inlet hole (554) or the forward inlet hole (555), and air is kept from flowing out from the other inlet hole (554, 555) with the sealing rings (63, 65). This can provide the same flow rate of air into the air motor (50). Then, users can use the air transporting device (60) to control the flow rate of air that is forced into the air motor (50) from the control device (70) to have the same flow rate when the driving axle (53) rotates in reverse or forward directions. This can provide a stable operating effect.

2. The position device (40) of the automatic tool changing assembly can hold the jacket (54) in an accurate location with the base (20) and the through hole (111) of the bottom frame

(10) is convergent shaped and this can make the jacket (54) moving into the through hole (111) and connecting to the nut (83).

3. The bearing (27) of the base (20) is mounted around and holds the driving axle (53) of the air motor (51) and this can let the driving axle (53) rotate stably.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatic tool changing assembly for a machine tool having a body, a spindle with an upper end and a lower end, a nut formed on the upper end of the spindle and a tool detachably connected to the lower end of the spindle and the automatic tool changing assembly having
 a bottom frame being adapted to mount on the machine tool and having
  a bottom panel being adapted to mount on the body of the machine tool and having
   a center;
   a top surface; and
   a through hole being formed in the center of the bottom panel;
  two sliding bars being securely mounted on the top surface of the bottom panel adjacent to the through hole; and
  a spring being mounted around one of the sliding bars;
 a base being movably mounted on the bottom frame above the bottom panel and abutting the spring;
 a cylinder block being securely mounted on the base and having
  a piston rod being securely mounted on the bottom panel and having
   a lower end being securely mounted on the top surface of the bottom panel; and
   an upper end;
  a piston disk being formed on the upper end of the piston rod; and
  an air cylinder being securely mounted on the base;
 an air motor being securely mounted on the base and having
  a cylinder being securely mounted in the base and having
   a top;
   a bottom;
   a reverse groove being transversally formed in the top of the cylinder and having
    a bottom; and
    a through hole being perpendicularly formed in the reverse groove near the bottom of the reverse groove; and
   a forward groove being transversally formed in the top of the cylinder and aligning with the reverse groove and having
    a bottom; and
    a through hole being perpendicularly formed in the forward groove near the bottom of the forward groove;
   a jacket being connected to the bottom of the cylinder and aligning with the through hole of the bottom panel to hold the nut of the upper end of the spindle;
   a mounting groove being transversally formed in the top of the cylinder parallel the reverse groove and the forward groove and having
    a middle;
    a tube hole being perpendicularly formed in the middle of the mounting groove;
    a reverse inlet hole being formed in the mounting groove near the tube hole and communicating with the reverse groove; and
    a forward inlet hole being formed in the mounting groove near the tube hole, faces to the reverse inlet hole and communicating with the forward groove; and
   a cylinder tube being connected to the tube hole of the mounting groove and the base; and
  an air transporting device being mounted in the air motor and having
   a mounting tube being mounted in the mounting groove of the air motor having
    an inner end being mounted in the mounting groove near the reverse inlet hole;
    an outer end;
    an annular flange being formed on the outer end of the mounting tube to contact with the air motor;
    an inserting hole being axially formed in the mounting tube; and
    an axle hole being formed in the inner end of the mounting tube and communicating with the inserting hole and having a diameter;
   a first compression ring being mounted in the mounting groove near the reverse inlet hole and having
    two ends; and
    two sealing flanges being respectively formed on the ends of the first compression ring;
   a first sealing ring being mounted in the mounting groove between the tube hole and the reverse inlet hole and having a same diameter as the diameter of the axle hole;
   a middle compression ring being mounted in the mounting groove near the tube hole adjacent to the first sealing ring and having
    two ends; and
    two sealing flanges being respectively formed on the ends of the middle compression ring;
   a second sealing ring being mounted in the mounting groove between the tube hole and the forward inlet hole and having a same diameter as the diameter of the axle hole;
   a second compression ring being mounted in the mounting groove near the forward inlet hole adjacent to the second sealing ring and having
    two ends; and
    two sealing flanges being respectively formed on the ends of the second compression ring;
   a mounting axle being mounted in the mounting tube, through the compression rings and the sealing rings and having
    a diameter being same as the diameter of the axle hole;
    an inner end being extended out the second compression ring;
    an outer end being extended out the inserting hole of the mounting tube;
    an outer head being mounted around the outer end of the mounting axle and abutting the annular flange;
    an inner head being mounted around the inner end of the mounting axle and abutting the second compression ring; and a neck being formed between the inner end and the outer end of the mounting axle; and an axle spring being mounted around the mounting axle in the mounting tube and having two ends respectively abutting the outer head of the mounting axle and mounting tube near the axle hole.

2. The automatic tool changing assembly for a machine tool as claimed in claim 1, wherein the first compression ring further has
a sidewall; and
four gas holes being formed through the sidewall of the first compression ring;

the middle compression ring further has
a sidewall; and
four gas holes being formed through the sidewall of the middle compression ring;

the second compression ring further has
a sidewall; and
four gas holes being formed through the sidewall of the second compression ring; and the automatic tool changing assembly further has a control device being connected to the air motor and having
a valve being connected to the air motor and having
a first induction pipe being connected to the reverse groove; and
a second induction pipe being connected to the forward groove; and
a lubricator being connected to the valve to lubricate air that flows into the valve.

3. The automatic tool changing assembly for a machine tool as claimed in claim 2, wherein the sliding bar kept free from the spring has a positioning hole being formed in the sliding bar;

the base further has
two sliding holes being formed in the base and mounted around the sliding bars of the bottom frame;
a lever hole being transversally formed in the base near the sliding bar having the positioning hole and the lever hole having
an inner end selectively communicating with the positioning hole of the sliding bar;
an outer end;
an inner surface; and
an inner thread being formed on the inner surface of the lever hole near the outer end;
an inlet hole being longitudinally formed in the base and communicating with the outer end of the lever hole;
a cylinder hole being longitudinally formed in the base near one of the sliding holes and having
a diameter; and
a position detect being formed in the base below the cylinder hole and having a diameter smaller than the diameter of the cylinder hole; and a connecting hole being transversally formed in the base between the outer end of the lever hole and the cylinder hole;

the cylinder block further has a rod spring being mounted around the piston rod and having two ends respectively abutting the bottom panel and the base;

the piston rod is extended through the cylinder hole and a piston hole;

the air cylinder is securely mounted on the base around the cylinder hole and has
a bottom being mounted on the cylinder hole of the base;
a top; and
a ventilating hole being formed in the top of the air cylinder and aligning with the cylinder hole; and the automatic tool changing assembly further has a positioning device being mounted in the base and having
a positioning lever being mounted in the lever hole of the base and having
an inner end being mounted in the inner end of the lever hole and facing the sliding bar having the positioning hole;
an outer end;
a piston being formed on the outer end of the positioning lever and having an outer end; and
a protrusion being formed on and protruding from the outer end of the piston;
a lever spring being mounted around the positioning lever and having two ends respectively connected with the sliding bar and the piston; and
a setscrew being mounted in the lever hole, engaging the inner thread and abutting the protrusion.

4. The automatic tool changing assembly for a machine tool as claimed in claim 3, wherein the base further has
a center; and
a mounting hole being formed in the center of the base and aligning with the through hole of the bottom panel and having
a diameter;
a mounting segment being formed in the base below the mounting hole and having a diameter smaller than the diameter of the mounting hole; and
a bearing being mounted in the mounting segment of the mounting hole;

the air motor further has a driving axle being formed on and protruding from the bottom of the cylinder and being mounted with the bearing in the mounting segment of the mounting hole and having a lower connecting end; and the jacket is connected to the lower connecting end of the driving axle.

* * * * *